United States Patent [19]

Clerk

[11] 3,905,281

[45] Sept. 16, 1975

[54] HYDRAULIC PISTONS

[76] Inventor: Robert Cecil Clerk, Edison House, Fullerton Rd., Glenrothes, Fife, Scotland

[22] Filed: June 15, 1973

[21] Appl. No.: 370,372

[52] U.S. Cl. .................................. 92/143; 92/158
[51] Int. Cl.² .................................... F01B 13/04
[58] Field of Search ................ 91/499; 92/143, 258

[56] References Cited
UNITED STATES PATENTS
3,113,491  10/1963  Borowka .............................. 92/158

FOREIGN PATENTS OR APPLICATIONS
602,978  1/1926   France ................................. 91/507
899,358  6/1962   United Kingdom .................. 91/499
872,890  7/1961   United Kingdom .................. 91/499

Primary Examiner—William L. Freeh
Attorney, Agent, or Firm—Imirie, Smiley & Linn

[57] ABSTRACT

The invention provides a piston for hydraulic pumps and motors. The piston crown is formed with a conical protrusion whose base runs out into an annular depression inside the piston rim, whereby shock waves are dissipated.

5 Claims, 1 Drawing Figure

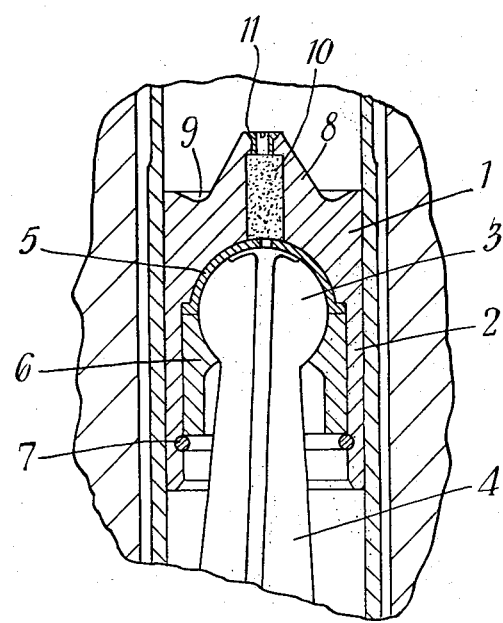

HYDRAULIC PISTONS

BACKGROUND OF THE INVENTION

This invention concerns improvements in pistons for hydraulic pumps and motors.

In piston-type hydraulic pumps/motors it is not uncommon, at certain stages of the pumping/motoring cycle, for surges preceded by a shock-wave to enter the cylinder and be arrested by the piston to the detriment of same and/or its associated thrust joints or bearings.

It is well known for hydraulic pistons to be formed with inverted or forward projecting skirts into which the shockwave is channelled and which, due to the mass effect of this skirt, is able to accept the radial reflections when the shockwave is stopped by the small residual piston crown area. Unfortunately such pistons are heavy and thus limit pump operating speed. Such pistons are also very long and must have a large running clearance to allow for relative distortions.

SUMMARY OF THE INVENTION

It is an object of the invention to provide a hydraulic piston which, if length is not necessary for other reasons, such as cantilever loading, can be quite short yet provide effective shock-wave damping without the terminal reflections being made to impinge directly on the cylinder bores, which can thus be formed as loose sleeves or liners of relatively thin section without suffering from shock fatigue.

To this end what I propose is a piston, the whole of which, when in use, operate within a cylinder subject to hydraulic pressure shock waves the crown of which piston is formed as a conical projection, the tip of which may with advantage be truncated, and the base of which runs into an annular depression just inside the rim of the said crown.

Although a highly acute cone angle is most efficient for shock dissipation, this will only be so if truncation is avoided so that the piston will have an incongruous shape with a mass approaching the inverted skirt piston. At the other extreme an excessively obtuse shallow crown projection will not effectively dissipate shock.

A most efficient compromise is a 60° included cone angle truncated so that the smallest diameter of the frusto cone is equal to one-fifth of the cylinder diameter, and having a base diameter three-fifths of cylinder diameter at the transition to the radius of curvature of the annular depression which is bounded at four-fifths of cylinder diameter by the inner edge of the crown rim. The radius of curvature of the annular depression would approximate to one-eighth of the cylinder diameter.

Even the very minor defficiency of the truncation can be turned to advantage by counter-boring it and inserting a porous sintered plug which will be more effective than a 60° conical point in "puncturing" the shock-front.

This plug can also serve as a filter and pressure impedance for lubrication directed to compliance joints and surfaces, for example between the piston and swashplate of an axial piston pump or motor.

BRIEF DESCRIPTION OF THE DRAWING

The single FIGURE is a fragmentary cross-sectional view taken axially through a piston according to the invention.

DETAILED DESCRIPTION OF THE INVENTION

The body 1 of the piston is formed with a skirt 2 and a hemi-spherical recess for the reception of the part spherical head 3 of the piston rod 4 in a cup bearing.

The cup bearing is comprised by the cap 5 and keeper 6 held in position by a clip 7 entered in a groove in the skirt 2.

The head of the piston is formed with a frusto-conical protrusion 8, which runs out into the annular depression 9.

A porous sintered plug 10 is entered in a counter-bore in the protrusion 8, and is held captive by a hollow screw 11.

A small bore in the cap 5 permits fluid to pass through the piston rod to lubricate its bottom bearing and other items.

In operation, the arrival of a shock-wave is funnelled down the cylinder, and in particular the shock-wave arriving when the piston is at maximum displacement and the cylinder suddenly uncovers a pressurized delivery port, and impinges on the conical projection which focuses the residual component of the shock wave not damped by the conical surface into the annular depression where it meets with the residual of the wave periphery not damped by a boundary layer attached to the cylinder walls.

At optimum geometry the residual shock forces are weak, with miniscule energy, and quite inocuous. When the shock wave impinges on the truncated tip of the conical projection, a secondary or reflected shock-wave is generated with a mainly radial component which, if the diameter of truncation is not excessive should be fully attenuated before impinging on the cylinder wall. A transition radius at the truncation diameter will allow a slightly greater diameter of truncation but an even greater amelioration can be achieved by insertion of the porous plug earlier mentioned.

I claim:

1. A hydraulic piston, the whole of which, when in use, operates within a cylinder subject to hydraulic pressure shock waves, comprising a piston body having a crown with an annular depression just within the rim of said crown, and a conical projection axially on said crown with its base disposed within said annular depression, said conical projection projecting substantially beyond the rim of said crown, and furthermore, wherein said conical projection includes a counter-bore therewithin, leading to a porous sintered plug contained within said conical projection.

2. A hydraulic piston according to claim 1 in which the projection has an included angle of 60°.

3. A hydraulic piston according to claim 1 in which the projection is truncated, the smallest diameter of the frusto - cone being equal to one-fifth of the cylinder diameter.

4. A hydraulic piston according to claim 1 in which the diameter of the base of the projection is three fifths of the cylinder diameter.

5. A hydraulic piston according to claim 1 in which the annular depression is bounded at four fifths cylinder diameter by the inner edge of the rim of said crown.

* * * * *